(12) United States Patent
Lai et al.

(10) Patent No.: US 9,795,930 B2
(45) Date of Patent: Oct. 24, 2017

(54) WATER SEPARATION COMPOSITE MEMBRANE

(71) Applicant: Industrial Technology Research Institute, Hsinchu (TW)

(72) Inventors: Yu-Lun Lai, Tainan (TW); Chih-Chang Chang, Taichung (TW); Shao-I Yen, Zhudong Township (TW); Jung-Nan Hsu, Taichung (TW); Chun-Nan Kuo, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/042,785

(22) Filed: Feb. 12, 2016

(65) Prior Publication Data

US 2017/0113191 A1    Apr. 27, 2017

Related U.S. Application Data

(63) Continuation-in-part of application No. 14/920,549, filed on Oct. 22, 2015.

(30) Foreign Application Priority Data

Jan. 6, 2016    (TW) .............................. 105100256 A (51) Int. Cl.
*B01D 69/12*        (2006.01)
*B01D 53/22*        (2006.01)
(Continued)

(52) U.S. Cl.
CPC ........... *B01D 69/12* (2013.01); *B01D 53/268* (2013.01); *B01D 71/021* (2013.01);
(Continued)

(58) Field of Classification Search
CPC .... B01D 53/228; B01D 53/268; B01D 69/10; B01D 69/12; B01D 71/021; B01D 71/024;
(Continued)

(56) References Cited

U.S. PATENT DOCUMENTS

| 8,685,144 B2 | 4/2014 | Claridge et al. |
| 8,709,964 B2 | 4/2014 | Ewald et al. |

(Continued)

FOREIGN PATENT DOCUMENTS

| TW | 456083 B | 9/2001 |
| TW | 201507973 A | 3/2015 |
| WO | WO 2014/027197 A1 | 2/2014 |

OTHER PUBLICATIONS

Taiwanese Office Action and Search Report for Taiwanese Application No. 105100256, dated Jun. 16, 2016.
(Continued)

*Primary Examiner* — Jason M Greene
(74) *Attorney, Agent, or Firm* — Birch, Stewart, Kolasch & Birch, LLP (57) ABSTRACT

A water separation composite membrane is provided. The water separation composite membrane includes a carrier with a plurality of pores, wherein the carrier is made of a polymer having a repeat unit of (Continued)

and a selective layer disposed on the porous carrier, wherein the selective layer consists of a plurality of graphene oxide layers.

13 Claims, 7 Drawing Sheets (51) Int. Cl.
| | |
|---|---|
| *B01D 71/02* | (2006.01) |
| *B01D 69/10* | (2006.01) |
| *B01D 71/56* | (2006.01) |
| *B01D 71/70* | (2006.01) |
| *B01D 71/50* | (2006.01) |
| *B01D 53/26* | (2006.01) |
| *B01D 71/48* | (2006.01) |

(52) U.S. Cl.
CPC ........... *B01D 71/024* (2013.01); *B01D 71/50* (2013.01); *B01D 71/56* (2013.01); *B01D 71/48* (2013.01); *B01D 2259/4508* (2013.01); *B01D 2325/04* (2013.01); *B01D 2325/20* (2013.01)

(58) Field of Classification Search
CPC .... B01D 71/50; B01D 71/56; B01D 2325/02; B01D 2325/04; B01D 2325/20
See application file for complete search history.

(56) References Cited

U.S. PATENT DOCUMENTS

| | | | | |
|---|---|---|---|---|
| 2013/0270188 A1* | 10/2013 | Karnik | ................ | B01D 53/228 210/650 |
| 2014/0069277 A1* | 3/2014 | Choi | ................... | B01D 53/228 96/13 |
| 2014/0230653 A1 | 8/2014 | Yu et al. | | |
| 2014/0318373 A1 | 10/2014 | Wood et al. | | |
| 2014/0353144 A1 | 12/2014 | Nakanishi et al. | | |
| 2015/0030968 A1 | 1/2015 | Schwab et al. | | |
| 2015/0053607 A1* | 2/2015 | Liu | ..................... | B01D 71/021 210/500.3 |
| 2015/0122814 A1 | 5/2015 | Tichborne et al. | | |
| 2015/0141711 A1* | 5/2015 | Chu | ....................... | B01D 69/10 568/918 |
| 2015/0165385 A1 | 6/2015 | Oh et al. | | |
| 2015/0231577 A1* | 8/2015 | Nair | .................... | B01D 71/024 210/640 |
| 2015/0321147 A1* | 11/2015 | Fleming | ................ | B01D 69/10 210/489 |
| 2016/0038885 A1* | 2/2016 | Hogen-Esch | .......... | B01D 69/12 210/321.6 |
| 2016/0058932 A1* | 3/2016 | Stetson, Jr. | .......... | B01D 71/021 210/646 |
| 2016/0074814 A1* | 3/2016 | Park | ....................... | B01D 69/12 210/500.33 |
| 2016/0339160 A1* | 11/2016 | Bedworth | ............. | B01D 69/10 |

OTHER PUBLICATIONS

Do Van Lam et al., "A robust and conductive metal-impregnated graphene oxide membrane selectively separating organic vapors", ChemComm, 2015, vol. 51, pp. 2671-2674.

Hang Li et al., "Ultrathin, Molecular-Sieving Graphene Oxide Membranes for Selective Hydrogen Separation", Science, Oct. 4, 2013, vol. 342, pp. 95-98.

Hubiao Huang et al., "Graphene oxide nanosheet: an emerging star material for novel separation membranes", Journal of Materials Chemistry A, 2014, vol. 2, pp. 13772-13782.

Hyo Won Kim et al., "Selective Gas Transport Through Few-Layered Graphene and Graphene Oxide Membranes", Science, Oct. 4, 2013, vol. 342, pp. 91-94.

Jie Shen et al., "Membranes with Fast and Selective Gas-Transport Channels of Laminar Graphene Oxide for Efficient CO2 Capture", Angewandte Communications, 2015, vol. 54, pp. 578-582.

Kunli Goh et al., "Graphene oxide as effective selective barriers on a hollow fiber membrane for water treatment process", Journal of Membrane Science, 2015, vol. 474, pp. 244-253.

R. R. Nair et al., "Unimpeded Permeation of Water Through Helium-Leak-Tight Graphene-Based Membranes", Science, Jan. 27, 2012, vol. 335, pp. 442-444.

\* cited by examiner

WATER SEPARATION COMPOSITE MEMBRANE

CROSS REFERENCE TO RELATED APPLICATIONS

This application is a Continuation-In-Part of pending U.S. patent application Ser. No. 14/920,549, filed Oct. 22, 2015 and entitled "water separation composite membrane". Further, the application is based on, and claims priority from, Taiwan Application Serial Number 105100256, filed on Jan. 6, 2016, the disclosure of which is hereby incorporated by reference herein in its entirety.

TECHNICAL FIELD

The technical field relates to a water separation composite membrane.

BACKGROUND

Conventionally, the household dehumidifier uses a refrigerant compressor to condense the moisture in the air to achieve dehumidification. However, the use of refrigerant results in problems such as ozone layer depletion. Therefore, there is need in developing a novel dehumidification technique without using refrigerant.

Among all the dehumidifying technologies available today, there is a membrane dehumidification device, which requires neither the heater nor the refrigerant. The membrane dehumidification device is able to remove moisture from indoor air through a water vapor-air separation membrane and a vacuum pump. Since the dehumidifying mechanism in the membrane dehumidification device is achieved through the use of a water vapor selective membrane, not only the dehumidification is not restricted by ambient air temperature and moisture content, but also does not need to use any refrigerant as those conventional dehumidification devices did.

The performance of the membrane dehumidification device depends on the characteristic of the water vapor selective membrane. Therefore, a novel membrane with a high water vapor permeance and high water/air separation factor is desired for improving the performance of the membrane dehumidification device.

SUMMARY

According to embodiments of the disclosure, the disclosure provides a water separation composite membrane, including a carrier with a plurality of pores, wherein the carrier is made of a polymer having a repeat unit of and a selective layer disposed on the porous carrier, wherein the selective layer consists of a plurality of graphene oxide layers.

According to another embodiment of the disclosure, the disclosure also provides a water separation composite membrane, including a carrier with a plurality of pores; and a selective layer disposed on the porous carrier, wherein the selective layer consists of a plurality of graphene oxide layers and an organic compound distributed between any two adjacent graphene oxide layers, wherein the organic compound has a structure represented by Formula (I) or Formula (II)

Formula (I)

Formula (II)

wherein X is independent —OH, —NH$_2$, —SH, $R^1$ and $R^2$ are independent hydrogen, $C_{1-12}$ alkyl; A is and, n is 2-3 when X is —OH, —NH$_2$, or —SH, and n is 0-1 when X is A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

This description is made for the purpose of illustrating the general principles of the disclosure and should not be taken in a limiting sense. The scope of the disclosure is determined by reference to the appended claims.

The disclosure provides a water separation composite membrane, which can serve as a water vapor/air separation component of a membrane dehumidification device. The water separation composite membrane of the disclosure includes a selective layer and a carrier, wherein the adhesion between the selective layer and the carrier is improved due to the chemical bonds (such as covalent bonds or hydrogen bonds) formed therebetween. Further, due to the multi-layer structure, thickness, and characteristic of the selective layer, the water separation composite membrane of the disclosure exhibits high water vapor permeance and high water/air separation factor when removing moisture from air. According to another embodiments of the disclosure, the selective layer further includes an organic compound distributed between any two adjacent graphene oxide layers, and the organic compound is bonded to the graphene oxide layer by means of chemical bonds to form a bridge between any two adjacent graphene oxide layers and to force any two adjacent graphene oxide layers separated from each other by an interval. Since the organic compound bridges between any two adjacent graphene oxide layers can control the distance between any two adjacent graphene oxide to form a passageway through which water molecules pass, resulting in improving the water vapor permeance and water/air separation factor of the water separation composite membrane. On the other hand, the moisture removed by the water separation composite membrane can be removed by applying a water vapor pressure difference across the water separation composite membrane. Therefore, the water separation composite membrane of the disclosure can be reusable.

Figure 1:
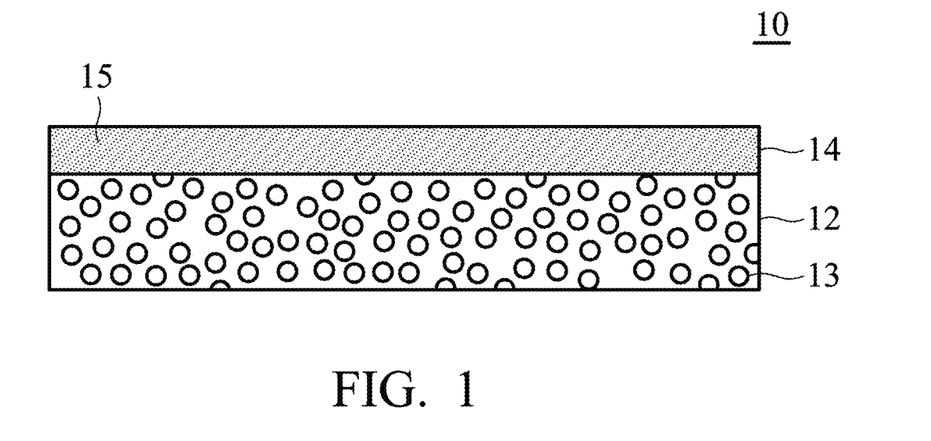
FIG. 1 is a schematic cross-sectional view of the water separation composite membrane according to an embodiment of the disclosure.

According to embodiments of the disclosure, as shown in FIG. 1, the water separation composite membrane 10 can include a carrier 12 with a plurality of pores 13, and a selective layer 14 disposed on the porous carrier, wherein the selective layer consists of a plurality of graphene oxide layers 15. In order to form chemical bonds (such as covalent bonds or hydrogen bonds) between the carrier and the selective layer in order to enhance the adhesion therebetween, the carrier can be made of a polymer having a repeat unit of or made of a polymer having a repeat unit having a moiety of

For example, the polymer having a repeat unit of or a repeat unit having a moiety of can be polyamide or polycarbonate. The pores of the carrier can have a diameter between 100 nm and 300 nm, in order to promote the moisture freely passing through. Further, the selective layer can have a thickness between 200 nm and 3000 nm, such as 400 nm and 2000 nm, in order to ensure that the water separation composite membrane employing the selective layer can have a water vapor permeance between $1\times10^{-6}$ mol/m²sPa and $1\times10^{-5}$ mol/m²sPa and a water/air separation factor between 200 and 3000 (measured at 20-35° C. and 60-80% RH). The selective layer can have a larger thickness when the specific graphene oxide deposition (g/cm²) is increased.

Figure 2:
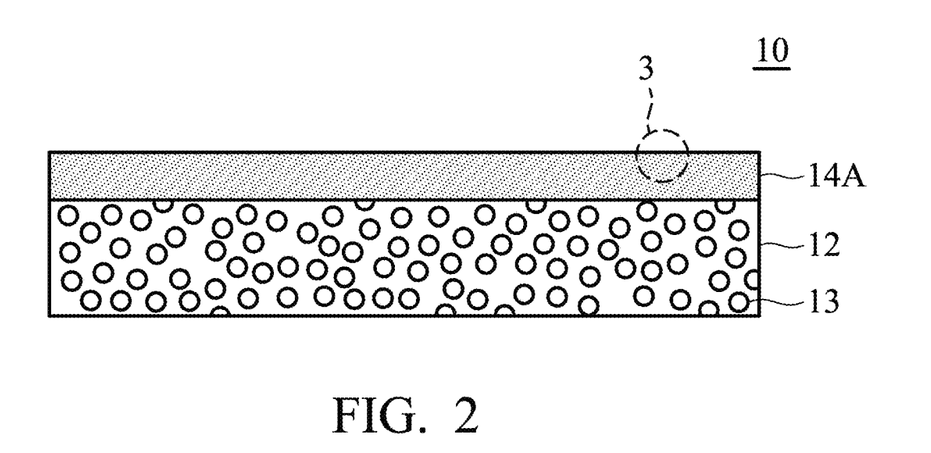
FIG. 2 is a schematic cross-sectional view of the water separation composite membrane according to another embodiment of the disclosure.
Figure 3:
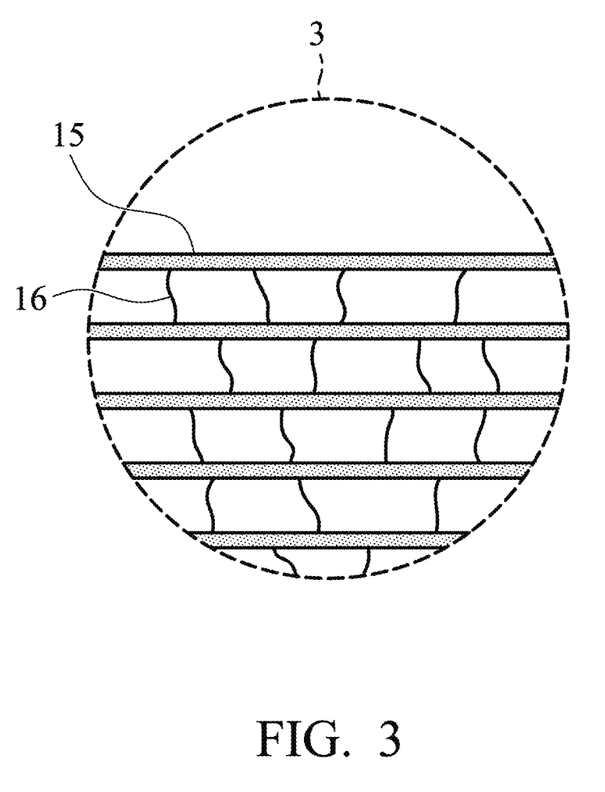
FIG. 3 is a close-up view schematic diagram of the region 3 of FIG. 2.

According to embodiments of the disclosure, as shown in FIG. 2, the water separation composite membrane 10 can include a carrier 12 with a plurality of pores 13, and a selective layer 14A disposed on the porous carrier 12. It should be noted that the selective layer includes a plurality of graphene oxide layers and an organic compound distributed between any two adjacent graphene oxide layers. The organic compound can have a structure represented by Formula (I) or Formula (II):

wherein, X is independent —OH, —NH₂, —SH,

R¹ and R² are independent hydrogen, $C_{1-12}$ alkyl; A is and, n is 0-3. The organic compound can be bonded to the graphene oxide layer by means of hydrogen bonds or ionic bonds, or further react with the graphene oxide layer via nucleophilic substitution reaction or condensation to form covalent bonds therebetween, resulting in that the organic compound or the moiety derived from the organic compound serves as bridge between any two adjacent graphene oxide layers. Namely, please referring to FIG. 3, which is a close-up view schematic diagram of region 3 of FIG. 2, one side of the organic compound 16 (or the moiety derived from the organic compound) (i.e. one of the group X of Formula (I) or Formula (II)) is bonded to one adjacent graphene oxide layer 15, and the other side of the organic compound 16 (or the moiety derived from the organic compound) (i.e. another group X of Formula (I) or Formula (II)) is bonded to another adjacent graphene oxide layer 15. As a result, the organic compound can force any two adjacent graphene oxide layers separated from each other by an interval. Since the organic compound bridges between any two adjacent graphene oxide layers can control the distance between any two adjacent graphene oxide to form a passageway through which water molecules pass, resulting in improving the water vapor permeance and water/air separation factor of the water separation composite membrane. Hence, a swelling degree of the interval can be controlled to be within 0.1% and 20.0%, resulting in that the water separation composite membrane employing the selective layer can have a water vapor permeance between $5 \times 10^{-6}$ mol/m²sPa and $5 \times 10^{-5}$ mol/m²sPa and a water/air separation factor between 1000 and $1 \times 10^{-7}$ (measured at 20-35° C. and 60-80% RH). The swelling degree of the interval is measured by following steps. First, the average interval width W1 of the selective layer (dry state) is measured by using X-ray diffraction measurement. Next, the selective layer is placed in water for a period of time (such as 60 minutes), and then the average interval width W2 of the swelling selective layer was measured. Next, the swelling degree of the interval is determined using the following equation:

$$\text{swelling degree} = \frac{(W2 - W1)}{W1} \times 100\%.$$

According to embodiments of the disclosure, regarding to the organic compound having the structure represented by Formula (I), n can be from 0 to 1, when X is

For example, the organic compound having the structure represented by Formula (I) can be Further, n can be from 2 to 3, when X is —OH, —NH₂, or —SH. For example, the organic compound having the structure represented by Formula (I) can be Further, the organic compound having the structure represented by Formula (II) can be The carrier can have a plurality of pores, and the carrier can be polyamide, polycarbonate, polyvinylidene difluoride (PVDF), polyether sulfone (PES), polytetrafluoroethene (PTFE), or cellulose acetate (CA). The pores of the carrier can have a diameter between 100 nm and 300 nm, in order to promote the moisture freely passing through. Further, the selective layer can have a thickness between 200 nm and 4000 nm, such as 400 nm and 3000 nm.

According to embodiments of the disclosure, the selective layer of the water separation composite membrane can be prepared by coating a composition on a substrate, or subjecting a composition to a suction deposition. The composition includes a graphene oxide powder and the organic compound, wherein the weight ratio of the organic compound to the graphene oxide powder can be from about 0.1 to 80, such as from 1 to 0.1, from 1 to 80, from 5 to 60, or from 5 to 40. Namely, in the selective layer, the weight ratio of the organic compound to the graphene oxide layer can be from about 0.1 to 80, such as from 1 to 0.1, from 1 to 80, from 5 to 60, or from 5 to 40.

Below, exemplary embodiments will be described in detail so as to be easily realized by a person having ordinary knowledge in the art. The disclosure concept may be embodied in various forms without being limited to the exemplary embodiments set forth herein. Descriptions of well-known parts are omitted for clarity.

Example 1: Water Separation Composite Membrane (I)

Figure 4:
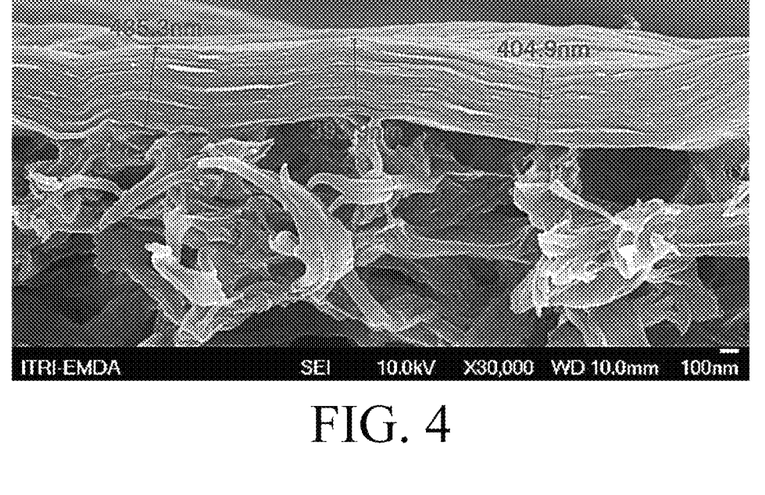
FIGS. 4-6 are scanning electron microscope (SEM) photographs of the water separation membrane (I)-(III) respectively.

1 part by weight of graphene oxide powder (synthesized using modified Hummer's method) was mixed with DI water, obtaining a solution with a solid content of 0.05 wt %. Next, a selective layer with a thickness of about 400 nm was formed by subjecting the composition to a suction deposition. Next, the selective layer was disposed on a porous hydrophilic nylon carrier (having pores with an average diameter of 200 nm) and baked at 50° C. for 60 minutes, obtaining the water separation composite membrane (I). FIG. 4 is a scanning electron microscope (SEM) photograph of the water separation composite membrane (I).

Example 2: Water Separation Composite Membrane (II)

Figure 5:
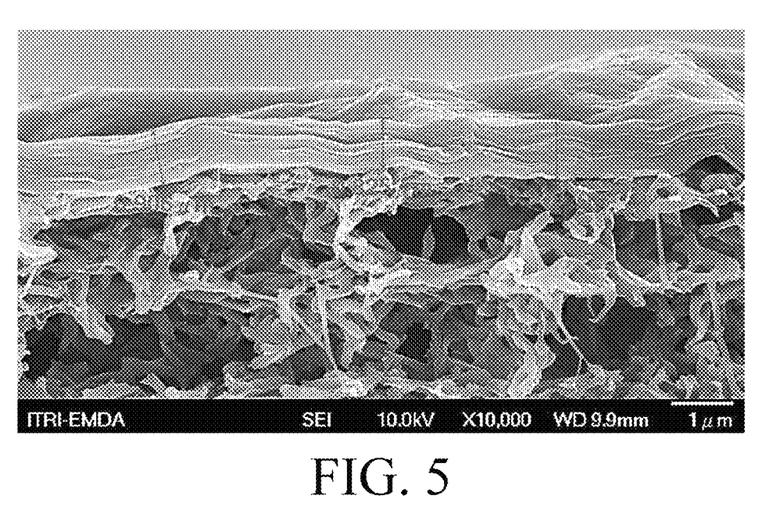

Example 2 was performed in the same manner as Example 1 except that the thickness of the selective layer was increased from about 400 nm to 800 nm, obtaining the water separation composite membrane (II). FIG. 5 is a scanning electron microscope (SEM) photograph of the water separation composite membrane (II).

Example 3: Water Separation Composite Membrane (III)

Figure 6:
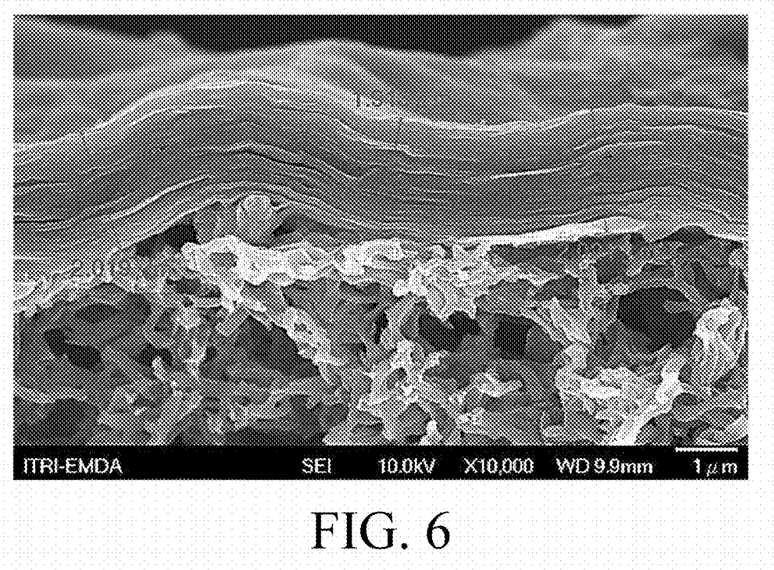

Example 3 was performed in the same manner as Example 1 except that the thickness of the selective layer was increased from about 400 nm to 2000 nm, obtaining the water separation composite membrane (III). FIG. 6 is a scanning electron microscope (SEM) photograph of the water separation composite membrane (III).

Example 4: Dehumidification Performance Test

Figure 7:
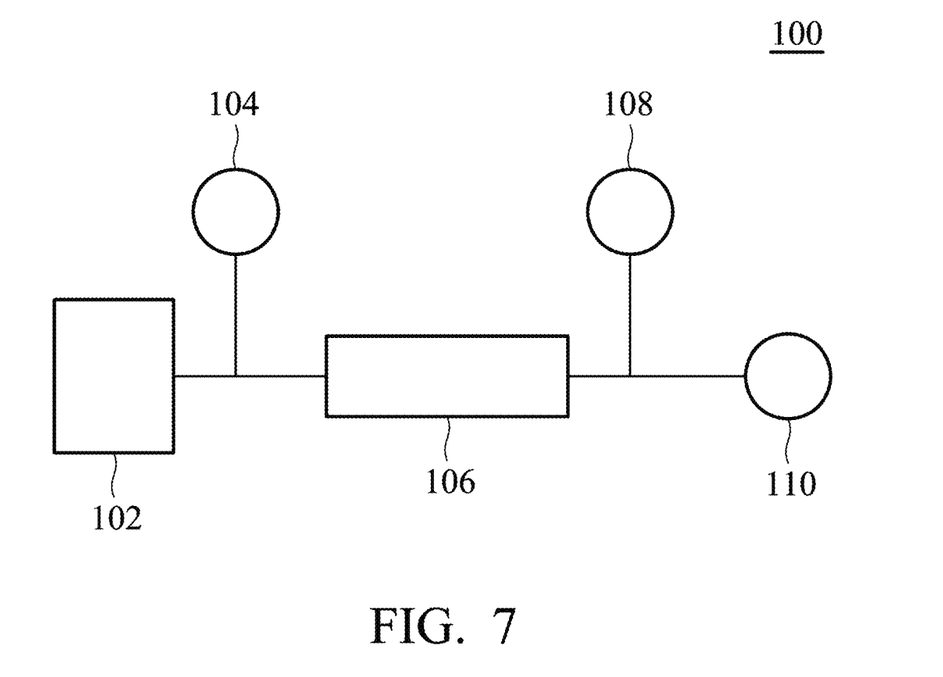
FIG. 7 is a schematically shows a block diagram of a dehumidification device as disclosed in Example 4.

The water vapor permeance between and the water/air separation factor of the water separation composite membranes (I)-(III) of Examples 1-3 were evaluated by a dehumidification device 100, and the results are shown in Table 1. As shown in FIG. 7, the dehumidification device 100 included a constant temperature and humidity device 102 to introduce a gas flow with specific humidity at specific temperature (such as 25° C./80% RH) to pass through the water separation composite membrane 106 of the disclosure. A first hygrothermometer 104 was used to measure the humidity and temperature of the gas flow before passing through the water separation composite membrane 106. A second hygrothermometer 108 was used to measure the humidity and temperature of the gas flow after passing through the water separation composite membrane 106. Further, the dehumidification device 100 included a vacuum pump to ensure the gas flow passing through the water separation composite membrane 106. The water vapor permeance between and the water/air separation factor of the water separation composite membrane 106 was calculated from the measured values of the first hygrothermometer 104 and the second hygrothermometer 108.

TABLE 1

|  | membrane (I) | membrane (II) | membrane (III) |
| --- | --- | --- | --- |
| thickness of the selective layer | ~400 nm | ~800 nm | ~2000 nm |
| water vapor permeance (mol/m$^2$sPa) | $1 \times 10^{-5}$ | $8 \times 10^{-6}$ | $6 \times 10^{-6}$ |
| water/air separation factor | ~200 | ~1000 | ~1000 |

As shown in Table 1, with the increase of the thickness of the selective layer, the water separation composite membrane exhibits an improved water/air separation factor.

Example 5: Water Separation Composite Membrane (IV)

1 part by weight of graphene oxide powder (synthesized using modified Hummer's method) was mixed with DI water, obtaining a first solution with a solid content of 0.05 wt %. Next, 0.1 parts by weight of ethanedial was mixed with DI water, obtaining a second solution with a solid content of 1.0 wt %. Next, the first solution and the second solution were mixed and stood at 50° C. for 60 minutes, obtaining a third solution (the weight ratio of the graphene oxide powder to the ethanedial was 1:0.1). Next, a selective layer was formed by subjecting the third composition to a suction deposition. Next, the selective layer was disposed on a porous hydrophilic nylon carrier (having pores with an average diameter of 200 nm) and baked at 50° C. for 60 minutes, obtaining the water separation composite membrane (IV). The average interval width of the graphene oxide layers of the water separation composite membrane (IV) at dry membrane state was measured by using X-ray diffraction measurement. Next, average interval width of the graphene oxide layers of the water separation composite membrane (IV) was measured again by using X-ray diffraction measurement, after placing the water separation composite membrane (IV) in water for 60 minutes. The results are shown in Table 2.

Example 6: Water Separation Composite Membrane (V)

Figure 8:
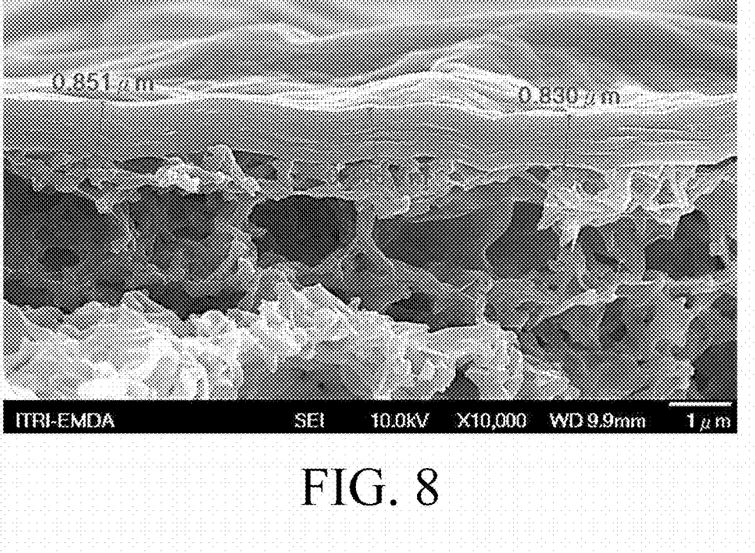
FIGS. 8-10 are scanning electron microscope (SEM) photographs of the water separation composite membranes (V), (XI), and (XIV) respectively.

Example 6 was performed in the same manner as Example 5 except that the weight of ethanedial was increased from 0.1 parts by weight to 5 parts by weight, resulting that the third composition has the weight ratio of the graphene oxide powder to the ethanedial of 1:5 and obtaining the water separation composite membrane (V) (with a thickness of 800 nm). The average interval width of the graphene oxide layers of the water separation composite membrane (V) at dry membrane state was measured by using X-ray diffraction measurement. Next, average interval width of the graphene oxide layers of the water separation composite membrane (V) was measured again by using X-ray diffraction measurement, after placing the water separation composite membrane (V) in water for 60 minutes. The results are shown in Table 2. FIG. 8 is a scanning electron microscope (SEM) photograph of the water separation composite membrane (V).

Example 7: Water Separation Composite Membrane (VI)

Example 7 was performed in the same manner as Example 5 except that the weight of ethanedial was increased from 0.1 parts by weight to 10 parts by weight, resulting that the third composition has the weight ratio of the graphene oxide powder to the ethanedial of 1:10 and obtaining the water separation composite membrane (VI). The average interval width of the graphene oxide layers of the water separation composite membrane (VI) at dry membrane state was measured by using X-ray diffraction measurement. Next, average interval width of the graphene oxide layers of the water separation composite membrane (VI) was measured again by using X-ray diffraction measurement, after placing the water separation composite membrane (VI) in water for 60 minutes. The results are shown in Table 2.

Example 8: Water Separation Composite Membrane (VII)

Example 8 was performed in the same manner as Example 5 except that the weight of ethanedial was increased from 0.1 parts by weight to 15 parts by weight, resulting that the third composition has the weight ratio of the graphene oxide powder to the ethanedial of 1:15 and obtaining the water separation composite membrane (VII). The average interval width of the graphene oxide layers of the water separation composite membrane (VII) at dry membrane state was measured by using X-ray diffraction measurement. Next, average interval width of the graphene oxide layers of the water separation composite membrane (VII) was measured again by using X-ray diffraction measurement, after placing the dehumidifying composite membrane (VII) in water for 60 minutes. The results are shown in Table 2.

Example 9: Water Separation Composite Membrane (VIII)

Example 9 was performed in the same manner as Example 5 except that the weight of ethanedial was increased from 0.1 parts by weight to 20 parts by weight, resulting that the third composition has the weight ratio of the graphene oxide powder to the ethanedial of 1:20 and obtaining the water separation composite membrane (VIII). The average interval width of the graphene oxide layers of the water separation composite membrane (VIII) at dry membrane state was measured by using X-ray diffraction measurement. Next, average interval width of the graphene oxide layers of the water separation composite membrane (VIII) was measured again by using X-ray diffraction measurement, after placing the dehumidifying composite membrane (VIII) in water for 60 minutes. The results are shown in Table 2.

Example 10: Water Separation Composite Membrane (IX)

Example 10 was performed in the same manner as Example 5 except that the weight of ethanedial was increased from 0.1 parts by weight to 80 parts by weight, resulting that the third composition has the weight ratio of the graphene oxide powder to the ethanedial of 1:80 and obtaining the water separation membrane (IX). The average interval width of the graphene oxide layers of the water separation composite membrane (IX) at dry membrane state was measured by using X-ray diffraction measurement. Next, average interval width of the graphene oxide layers of the water separation composite membrane (IX) was measured again by using X-ray diffraction measurement, after placing the water separation composite membrane (IX) in water for 60 minutes. The results are shown in Table 2.

TABLE 2

|  | weight ratio of the graphene oxide powder to the ethanedial | interval width (nm)(dry membrane) | interval width (nm)(wet membrane) | swelling degree of the interval |
|---|---|---|---|---|
| water separation composite membrane (I) | 1:0 | 0.86 | 1.15 | 33.7% |
| water separation composite membrane (IV) | 1:0.1 | 0.92 | 1.02 | 10.8% |

TABLE 2-continued

|  | weight ratio of the graphene oxide powder to the ethanedial | interval width (nm)(dry membrane) | interval width (nm)(wet membrane) | swelling degree of the interval |
|---|---|---|---|---|
| water separation composite membrane (V) | 1:5 | 0.98 | 1.07 | 9.2% |
| water separation composite membrane (VI) | 1:10 | 0.91 | 1.05 | 15.4% |
| water separation composite membrane (VII) | 1:15 | 0.93 | 1.05 | 12.9% |
| water separation composite membrane (VIII) | 1:20 | 0.94 | 0.99 | 5.3% |
| water separation composite membrane (IX) | 1:80 | 1.15 | 1.16 | 0.8% |

Example 11: Water Separation Composite Membrane (X)

Example 11 was performed in the same manner as Example 5 except that the third composition was directly coated on the porous hydrophilic nylon carrier, obtaining the water separation composite membrane (X).

Example 12: Water Separation Composite Membrane (XI)

Figure 9:
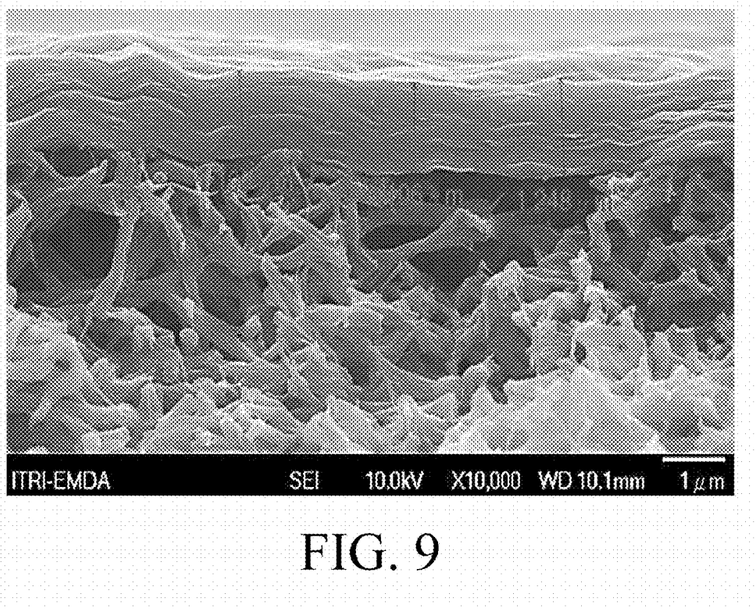

1 part by weight of graphene oxide powder was mixed with DI water, obtaining a first solution with a solid content of 0.5 wt %. Next, 5 parts by weight of 1,2-ethanediamine was mixed with DI water, obtaining a second solution with a solid content of 1.0 wt %. Next, the first solution and the second solution were mixed and stood at 50° C. for 60 minutes, obtaining a third solution (the weight ratio of the graphene oxide powder to the 1,2-ethanediamine was 1:5). Next, a selective layer was formed by subjecting the third composition to a suction deposition. Next, the selective layer was disposed on a porous hydrophilic nylon carrier (having pores with an average diameter of 200 nm) and baked at 50° C. for 60 minutes, obtaining the water separation composite membrane (XI). FIG. 9 is a scanning electron microscope (SEM) photograph of the water separation composite membrane (XI).

Example 13: Water Separation Composite Membrane (XII)

Example 13 was performed in the same manner as Example 12 except that the weight of 1,2-ethanediamine was increased from 5 parts by weight to 10 parts by weight, resulting that the third composition has the weight ratio of the graphene oxide powder to the 1,2-Ethanediamine of 1:10 and obtaining the water separation composite membrane (XII).

Example 14: Water Separation Composite Membrane (XIII)

1 part by weight of graphene oxide powder was mixed with DI water, obtaining a first solution with a solid content of 0.5 wt %. Next, 10 parts by weight of 1,3-propanediamine was mixed with DI water, obtaining a second solution with a solid content of 1.0 wt %. Next, the first solution and the second solution were mixed and stood at 50° C. for 60 minutes, obtaining a third solution (the weight ratio of the graphene oxide powder to the 1,3-propanediamine was 1:10). Next, a selective layer was formed by subjecting the third composition to a suction deposition. Next, the selective layer was disposed on a porous hydrophilic nylon carrier (having pores with an average diameter of 200 nm) and baked at 50° C. for 60 minutes, obtaining the water separation composite membrane (XIII) The average interval width of the graphene oxide layers of the water separation composite membrane (XIII) at dry membrane state was measured by using X-ray diffraction measurement. Next, average interval width of the graphene oxide layers of the water separation composite membrane (XIII) was measured again by using X-ray diffraction measurement, after placing the water separation membrane (XIII) in water for 60 minutes. The results are shown in Table 3.

Example 15: Water Separation Composite Membrane (XIV)

Figure 10:
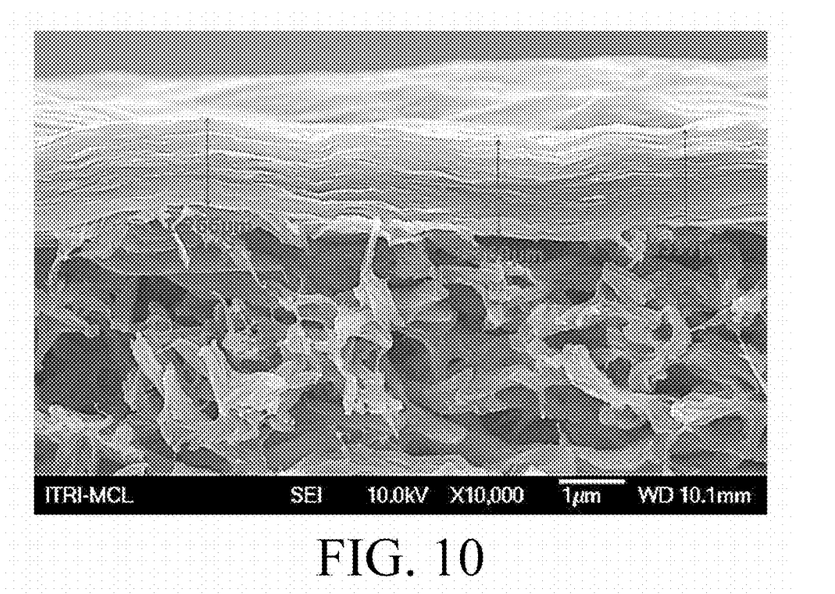

Example 15 was performed in the same manner as Example 14 except that the weight of 1,3-propanediamine was increased from 10 parts by weight to 20 parts by weight, resulting that the third composition has the weight ratio of the graphene oxide powder to the 1,3-propanediamine of 1:20 and obtaining the water separation composite membrane (XIV). FIG. 10 is a scanning electron microscope (SEM) photograph of the water separation composite membrane (XIV). The average interval width of the graphene oxide layers of the water separation membrane (XIV) at dry membrane state was measured by using X-ray diffraction measurement. Next, average interval width of the graphene oxide layers of the water separation composite membrane (XIV) was measured again by using X-ray diffraction measurement, after placing the water separation composite membrane (XIV) in water for 60 minutes. The results are shown in Table 3.

Example 16: Water Separation Composite Membrane (XV)

Example 16 was performed in the same manner as Example 14 except that the weight of 1,3-propanediamine was increased from 10 parts by weight to 40 parts by weight, resulting that the third composition has the weight ratio of the graphene oxide powder to the 1,3-propanediamine of 1:40 and obtaining the water separation composite membrane (XV). The average interval width of the graphene oxide layers of the water separation composite membrane (XV) at dry membrane state was measured by using X-ray diffraction measurement. Next, average interval width of the graphene oxide layers of the water separation composite membrane (XV) was measured again by using X-ray diffraction measurement, after placing the water separation composite membrane (XV) in water for 60 minutes. The results are shown in Table 3.

Example 17: Water Separation Composite Membrane (XVI)

Example 17 was performed in the same manner as Example 14 except that the weight of 1,3-propanediamine was increased from 10 parts by weight to 80 parts by weight, resulting that the third composition has the weight ratio of the graphene oxide powder to the 1,3-propanediamine of 1:80 and obtaining the water separation composite membrane (XVI). The average interval width of the graphene oxide layers of the water separation composite membrane (XVI) at dry membrane state was measured by using X-ray diffraction measurement. Next, average interval width of the graphene oxide layers of the water separation composite membrane (XVI) was measured again by using X-ray diffraction measurement, after placing the water separation composite membrane (XVI) in water for 60 minutes. The results are shown in Table 3.

TABLE 3

| | weight ratio of the graphene oxide powder to the 1,3-propanediamine | interval width (nm)(dry membrane) | interval width (nm)(wet membrane) | swelling degree of the interval |
|---|---|---|---|---|
| water separation composite membrane (I) | 1:0 | 0.86 | 1.15 | 33.7% |
| water separation composite membrane (XIII) | 1:10 | 1.00 | 1.09 | 9.0% |
| water separation composite membrane (XIV) | 1:20 | 1.10 | 1.15 | 4.5% |
| water separation composite membrane (XV) | 1:40 | 1.17 | 1.19 | 1.7% |
| water separation composite membrane (XVI) | 1:80 | 1.24 | 1.21 | −2.5% |

As shown in Table 2 and Table 3, the water separation composite membrane (I) having the selective layer without the organic compound (ethanedial or 1,3-propanediamine) has a relative high swelling degree of the interval. To the contrary, with the increase of the weight of the organic compound (ethanedial or 1,3-propanediamine), the swelling degree of the interval of the dehumidifying composite membrane is reduced. It means the addition of the organic compound can indeed bridge between two adjacent graphene oxide layers to maintain the interval width between any two adjacent graphene oxide layers within a specific range. As a result, a passageway, through which water molecules pass, can be formed between two adjacent graphene oxide layers, resulting in improving the water vapor permeance and water/air separation factor of the dehumidifying composite membrane.

Example 18: Dehumidification Performance Test

The water vapor permeance and the water/air separation factor of the dehumidifying composite membranes (V) and (XII) of Examples 6 and 13 were evaluated by the dehumidification device 100 as shown in FIG. 7 at 25° C./80% RH, and the results are shown in Table 4. Furthermore, the water vapor permeance and the water/air separation factor of the dehumidifying composite membrane (V) of Example 6 were evaluated by the dehumidification device 100 as shown in FIG. 7 at 29° C./60% RH, and the results are also shown in Table 4.

TABLE 4

|  | water separation composite membrane (II) | water separation composite membrane (V) (measured at 25° C./ 80% RH) | water separation composite membrane (V) (measured at 29° C./ 60% RH) | water separation composite membrane (XII) |
|---|---|---|---|---|
| thickness of the selective layer | ~800 nm | ~800 nm | ~800 nm | ~800 nm |
| water vapor permeance (mol/m²sPa) | $8 \times 10^{-6}$ | $1.24 \times 10^{-5}$ | $1.19 \times 10^{-5}$ | $9 \times 10^{-6}$ |
| water/air separation factor | ~1000 | ~$5.75 \times 10^6$ | ~$3.79 \times 10^6$ | ~2000 |

As shown in Table 4, the water separation composite membrane of the disclosure having the selective layer including the organic compound exhibits higher water vapor permeance and water/air separation factor in comparison with the water separation composite membrane without the organic compound having the structure represented by Formula (I) or (II) within the selective layer. Furthermore, the water separation composite membrane (V) has a water/air separation factor about $3.79 \times 10^6$ when being measured at 29° C./60% RH.

Example 19: Water Separation Composite Membrane (XVII)

Example 19 was performed in the same manner as Example 6 except that the thickness was increased from about 800 nm to about 1400 nm, obtaining the water separation composite membrane (XVII).

Example 20: Water Separation Composite Membrane (XVIII)

Example 20 was performed in the same manner as Example 6 except that the thickness was increased from about 800 nm to about 3000 nm, obtaining the water separation composite membrane (XVIII).

Example 21: Dehumidification Performance Test

The water vapor permeance and the water/air separation factor of the dehumidifying composite membranes (XVII) and (XVIII) of Examples 19 and 20 were evaluated by the dehumidification device 100 as shown in FIG. 7 at 25° C./80% RH, and the results are shown in Table 5.

TABLE 5

|  | water separation composite membrane (V) | water separation composite membrane (XVII) | water separation composite membrane (XVIII) |
|---|---|---|---|
| thickness of the selective layer | ~800 nm | ~1400 nm | ~3000 nm |
| water vapor permeance (mol/m²sPa) | $1.24 \times 10^{-5}$ | $1.05 \times 10^{-5}$ | $1.0 \times 10^{-5}$ |
| water/air separation factor | ~$5.75 \times 10^6$ | ~$5.12 \times 10^6$ | ~$5.0 \times 10^6$ |

It will be clear that various modifications and variations can be made to the disclosed methods and materials. It is intended that the specification and examples be considered as exemplary only, with a true scope of the disclosure being indicated by the following claims and their equivalents.

What is claimed is:

1. A water separation composite membrane, comprising:
a carrier with a plurality of pores; and
a selective layer disposed on the porous carrier, wherein the selective layer consists of a plurality of graphene oxide layers and an organic compound distributed between any two adjacent graphene oxide layers, wherein the organic compound has a structure represented by Formula (I) or Formula (II)

Formula (I)

Formula (II)

wherein X is independent —OH, —NH₂, —SH,

$R^1$ and $R^2$ are independent hydrogen, $C_{1-12}$ alkyl; A is and, n is 2-3 when X is —OH, —NH₂, or —SH, and n is 0-1 when X if 2. The water separation composite membrane as claimed in claim 1, wherein the carrier has a plurality of pores, and the carrier is made of a polymer having a repeat unit of

3. The water separation composite membrane as claimed in claim 2, wherein the pores of the carrier have a diameter between 100 nm and 300 nm.

4. The water separation composite membrane as claimed in claim 1, wherein the polymer is polycarbonate or polyamide.

5. The water separation composite membrane as claimed in claim 1, wherein the selective layer has a thickness between 200 nm and 4000 nm.

6. The water separation composite membrane as claimed in claim 1, wherein the selective layer has a thickness between 800 nm and 3000 nm.

7. The water separation composite membrane as claimed in claim 1, wherein the organic compound is -continued 8. The water separation composite membrane as claimed in claim 1, wherein the organic compound further reacts with the graphene oxide layer.

9. The water separation composite membrane as claimed in claim 1, wherein there is covalent bond, hydrogen bond, or ionic bond between the organic compound and the graphene oxide layer.

10. The water separation composite membrane as claimed in claim 1, wherein there is an interval between any two adjacent graphene oxide layers, and a swelling degree of the interval is between 0.1% and 20.0%.

11. The water separation composite membrane as claimed in claim 1, wherein the weight ratio of the organic compound to the graphene oxide layer is from 0.1 to 80.

12. The water separation composite membrane as claimed in claim 1, wherein the water separation composite membrane has a water vapor transmission rate between $5 \times 10^{-6}$ mol/m$^2$sPa and $5 \times 10^{-5}$ mol/m$^2$sPa.

13. The water separation composite membrane as claimed in claim 1, wherein the water separation composite membrane has a water/air separation factor between 1000 and $1 \times 10^7$.

* * * * *